United States Patent [19]
Stoffels

[11] Patent Number: 5,761,981
[45] Date of Patent: Jun. 9, 1998

[54] SEGMENT PLATE FOR A SAW BLADE AND A SAW BLADE WITH SEGMENT PLATES

[75] Inventor: Karl-Heinz Stoffels, Meerbusch, Germany

[73] Assignee: Sandvik AB, Sandviken, Sweden

[21] Appl. No.: 427,561

[22] Filed: Apr. 24, 1995

Related U.S. Application Data

[63] Continuation of Ser. No. 105,913, Aug. 12, 1993, abandoned.

[30] Foreign Application Priority Data

Aug. 13, 1992 [DE] Germany .......................... 42 26 729.3
Mar. 18, 1993 [DE] Germany .......................... 43 08 596.2

[51] Int. Cl.⁶ ......................................................... B27B 33/12
[52] U.S. Cl. .......................... 83/840; 83/835; 83/698.41; 83/839; 241/294
[58] Field of Search .......................... 83/839, 840, 838, 83/848, 845, 835, 698.41, 841–844; 407/41, 49, 50, 108, 109, 110; 241/294

[56] References Cited

U.S. PATENT DOCUMENTS

| | | | |
|---|---|---|---|
| 1,278,630 | 9/1918 | Freas | 83/838 |
| 1,714,700 | 5/1929 | Stull | 407/50 |
| 3,633,637 | 1/1972 | Kolesh et al. | 83/840 |
| 3,899,813 | 8/1975 | Lovendahl | 83/839 |
| 4,257,302 | 3/1981 | Heimbrand | 83/839 |
| 4,887,945 | 12/1989 | Pano | 407/50 |

FOREIGN PATENT DOCUMENTS 68984  8/1958  France ..................... 143/133

*Primary Examiner*—Rinaldi I. Rada
*Assistant Examiner*—Allan M. Schrock
*Attorney, Agent, or Firm*—Burns, Doane, Swecker & Mathis, L.L.P.

[57] ABSTRACT

A circular saw blade includes a disc portion whose peripheral portion comprises a series of straight sections. A segment plate which carries at least one replaceable cutting member is attached to each straight section. Each segment plate has a first slot for receiving the cutting member and a second slot for receiving a clamping wedge. A portion of the segment plate disposed between the slots defines a clamping area which is pushed tightly against the cutting member by the clamping wedge. Each segment plate has a projection received in a recess of the disc.

10 Claims, 5 Drawing Sheets

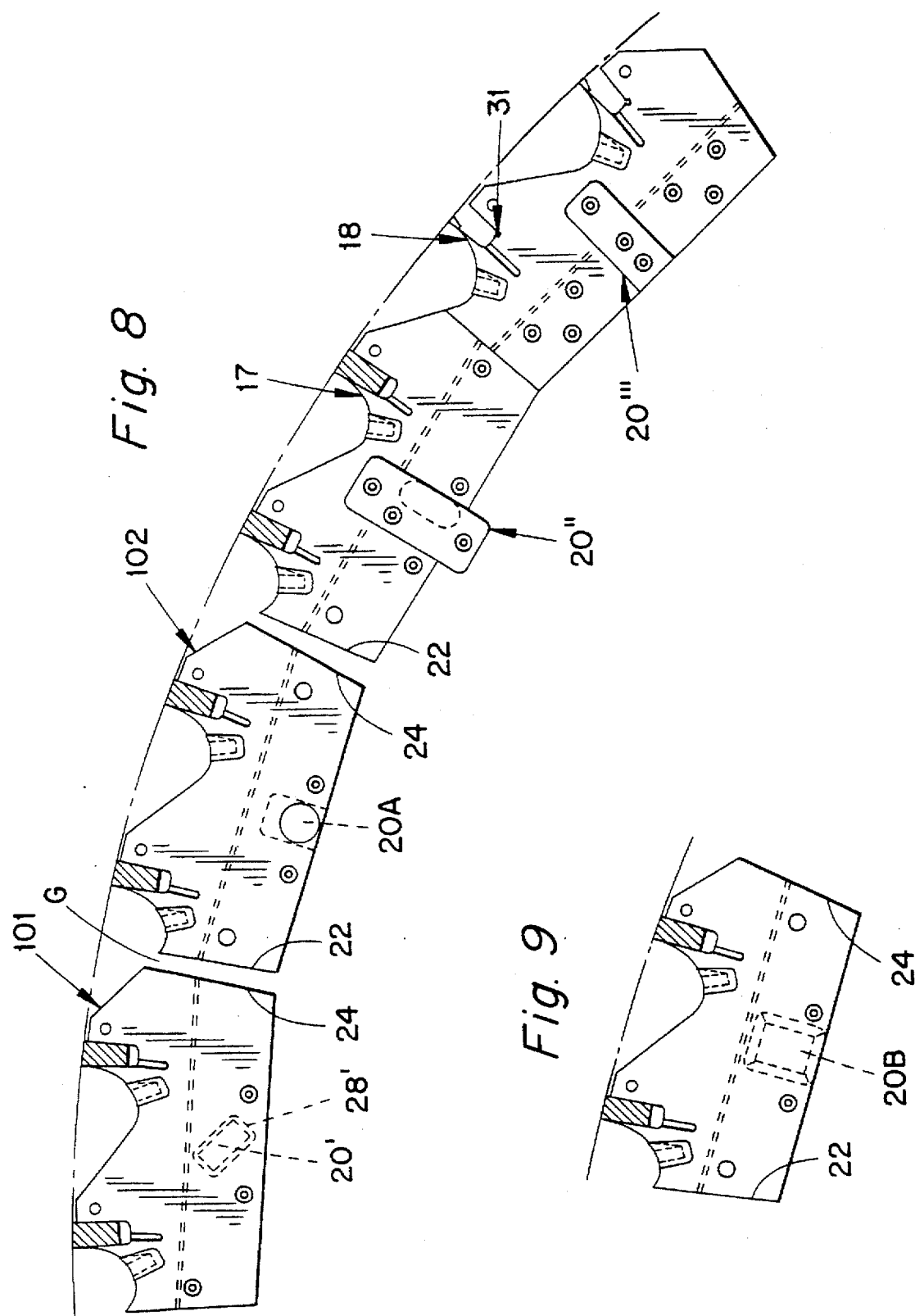

SEGMENT PLATE FOR A SAW BLADE AND A SAW BLADE WITH SEGMENT PLATES

This application is a Continuation of Application No. 08/105,913, filed August 12, 1993 now abandoned.

BACKGROUND OF THE INVENTION

The present invention relates to a segment plate for a saw blade, having slots transversely to the plane of the segment plate which define at least one receiving means for an interchangeable plate, preferably made of hard metal. The present invention also relates to a circular saw blade comprising a substantially circular disc with segment plates which can be secured along the periphery of the blade.

These kinds of segment plates and a corresponding circular saw blade, referred to as a "cold circular saw blade" are disclosed in German Pat. No. 556,441.

In the known case, the segments for the circular saw blade are short annular sections, a radially inner portion of which is screwed to a central circular saw disc and the radially outer portion of which has slots which extend substantially in the radial extent into which cutting inserts of cutting steel are soldered or welded. The radially outer edge of the segments in question is in the form of tooth flanks which are adapted to varying degrees to suit the course of the gripping faces and free faces of the cutting inserts inserted into the slots.

This prior art is based on the assumption that the cutting inserts have to be soldered into the slots in question or welded in the slots so that they are adequately secured. However, when cutting inserts are arranged directly on very large circular saw blades, there is always a risk that the high temperatures occurring therein will produce large and non-uniform stresses in the saw blade. Also, in the case of very large circular saw blades which are provided with a plurality of cutting inserts, if one single cutting tooth or a solder plate is missing, the entire circular saw blade is useless. By inserting individual segment plates it is possible to change just one segment plate when a cutting insert becomes defective or worn, wherein a corresponding annular segment has only relatively few cutting inserts. With the known circular saw blade, segments in the form of annular cut-out sections are riveted to the periphery of the circular disc and saw-tooth members of a special cutting metal are soldered or welded into the individual segments.

Changing the individual segment plates by grinding down the rivets and riveting a new segment, and also changing over individual cutting teeth from the segments by heating and re-soldering or by separating and re-welding is expensive and time-consuming. Also the teeth often have to be further worked to position the cutting edges correctly relative to each other, since soldering or welding which is accurate in terms of positioning is difficult.

In addition, slot milling devices are known which are similar in design and with which cutting inserts are detachably secured in annular segments arranged along the periphery of a disc (see Austrian Pat. No. 237,998). However, this publication does not disclose any concrete details on the detachable fixture. The problem of the cutting inserts becoming loose due to impact loads, such as those which occur on the teeth of circular saw blades, is not dealt with in this publication.

With the known prior art one drawback is considered to be the fact that when soldering or welding processes are used it is not possible to determine the position of the cutting edges with sufficient accuracy, so that further working or scraping is needed, or the individual cutting inserts become worn very quickly. In addition, the impact-like forces occurring during sawing are transmitted in the peripheral extent only by rivets. Riveting the single segment plate with a circular saw disc is also disadvantageous since it is relatively time-consuming to loosen and secure individual segment plates since the rivets first of all need to be removed by scraping, breaking down or similar methods.

SUMMARY OF PREFERRED EMBODIMENTS OF THE INVENTION

In the face of this prior art the aim of the present invention is to create a segment plate for a saw blade which has the above-mentioned features and which employs simple means to enable the cutting inserts and/or the segment plate together with the cutting inserts to be changed quickly and accurately in terms of position.

This problem is solved in that the receiving slot of the segment plate has two walls disposed in opposite relationship to each other and at a spacing apart, of which walls one is provided on an elastically movable clamping finger and the other is provided on a substantially rigid part of the segment plate, wherein the clamping finger is formed by the part of the segment plate which remains between two slots and wherein a clamping portion for pressing the clamping finger onto the interchangeable plate is provided in the other slot which forms a boundary around the clamping finger.

As already mentioned, the invention also relates to a circular saw blade comprised of a substantially circular disc with segment plates which are capable of being fixed along the periphery of the disc. These circular saw plates are in theory also disclosed in the aforementioned DE-PS 556,441 and are nowadays made with diameters of e.g. 2 to 3m, wherein even larger diameters are less a question of technical expertise than a question of economy.

Milling devices are already known which have a slot and a clamping finger to secure interchangeable plates, in particular interchangeable plates made of hard metal, the slots and clamping fingers fixing and securing the interchangeable plates. However, very heavy impact loads occur on the teeth of the saws and particularly also on those of circular saws, and these forces can very easily result in the teeth and/or segments becoming loose. For this reason, in the prior art, the aforementioned fixing is selected by way of riveting soldering and welding.

It has, however, been seen that it is possible to provide adequate fixture of the interchangeable plates by way of the solution according to the invention and the receiving means for the cutting insert in a slot, with additional fixing being performed by means of a clamping wedge portion which presses a clamping finger firmly against the interchangeable plate. This type of fixture at the same time makes it possible for the interchangeable plates of hard metal to be changed over quickly in the individual segments, so that it is not absolutely necessary to change over entire segment plates when the cutting elements become damaged, but instead the segment plates can remain fixed to one base member, e.g. the disc of a circular saw blade, and only one single interchangeable plate of hard metal or one single cutting insert needs to be changed. Therein, this type of fixture also permits an accurate arrangement, in terms of positioning, of the interchangeable plate, so that its cutting edge is disposed in an accurately defined position relative to the cutting edges of the rest of the cutting inserts of the associated segment plate and also relative to the cutting inserts of the rest of the segment plates.

According to the preferred embodiment of the invention, provided on the receiving slot of the segment plate by the elastically movable clamping finger, on the one hand, and an oppositely disposed substantially rigid portion of the segment plate, on the other hand, are two walls which extend to each other at varying acute angles. Therein, the cutting insert to be inserted should also have correspondingly oppositely disposed clamping surfaces which also extend at an acute angle relative to each other, this angle possibly being somewhat greater than the angle formed by the receiving faces or clamping faces relative to each other in the receiving slot of the segment plate. The sizes of the cutting insert and of the receiving slot are selected such that insertion of the cutting insert into the slot causes the clamping slot to be somewhat widened, and the clamping finger to bear against the cutting insert with prestress. By widening the receiving slot, the angle of the clamping faces is increased to the value beneath which the corresponding faces are inclined relative to each other on the cutting insert.

On the other hand, however, by providing the clamping wedge portion in an adjacent slot, such prestressing of the clamping finger is not absolutely necessary, since the necessary clamping force is produced by inserting the clamping wedge portion into the adjacent slot. To produce prestressing it is clearly not even necessary for the receiving slot to have oppositely disposed faces inclined towards one another, for the clamping finger is then spread apart by inserting a cutting insert with contact faces which are inclined towards each other at an acute angle, if the spacing between the clamping finger and the oppositely disposed face is less than the width or height of the cutting insert.

In connection with the present invention it is particularly expedient to use segment plates which have a ramp surface for the purpose of producing a slight prestressing of the clamping finger, this ramp surface extending at an acute angle relative to the oppositely disposed support surface which is disposed on the contact face of the substantially rigid portion of the segment plate, wherein, however, a break is provided at the end of the ramp surface, at which break the ramp surface makes a transition into a clamping face which is inclined so that it is substantially parallel or even oppositely disposed to the ramp surface, but which extends at least at a smaller acute angle to the oppositely disposed contact face than the ramp surface. With a design like this, the clamping finger already presses against the gripping face of the cutting insert with a certain prestressing, wherein the clamping force is additionally increased by the clamping wedge portion which is inserted into the adjacent slot. At the same time, however, the clamping force is prevented from producing a force which acts under the contact faces disposed at acute angles with a wedge-like effect pushing the cutting insert tangentially to the outside.

Therein, it has been shown to be expedient if a contact face is provided in the inside of the receiving slot for an interchangeable plate, on which contact face a suitable companion face of the interchangeable plate bears. Expediently, the rear side of the interchangeable plate bears against the abutment face disposed inside the slot, which abutment face does not necessarily have to form the base or end of the slot, but which extends substantially transversely to the walls of the slot, e.g. extending at right angles from the wall of the receiving slot formed by the rigid portion of the segment plate. Therein, the slot itself can be enlarged by the elasticity and bending properties of the clamping finger, and extend adjacent to the abutment face and there beyond into the segment plate.

Likewise, it is, however, also possible to use the free end of the clamping finger as an abutment face, as described, for example, in European Pat. No. 0 242 343. That patent specification and the application forming its basis deal extensively with the geometry of the receiving slot and also the geometry of the hard metal interchangeable plates, and the content of this publication is incorporated by reference. The cutting inserts and the corresponding receiving slots can thus also be of the forms and preferred designs, described in this European Patent Application. According to the present invention, the basic contour of the receiving slot, i.e. the face oppositely disposed to the clamping finger should, when used on a circular saw blade, extend, if possible, in the radial extent and generally substantially vertically to the direction of forward movement of the cutting elements. In addition to the embodiment described in the European Application, given the Publication No. 0 242 343, in accordance with the present invention the clamping finger is pressed by an additional clamping wedge portion firmly against the cutting insert, so that the cutting insert, even in a circular saw blade, has a firm seating, accurate in terms of positioning, and does not become loose when the saw is in use.

With another embodiment, the receiving slot can, however, be inclined relative to the radial direction, so that the tangential forces attacking the cutting inserts press the cutting insert in the direction of the base of the slot.

The clamping wedge portion is preferably secured in a slot adjacent to the receiving slot by means of a screw which extends through the wedge portion longitudinally, wherein the clamping finger is formed from the material of the segment plate which remains between the two slots. To this end, the base of the slot which receives the wedge portion expediently has a suitable threaded bore.

Roughly speaking, the segment plate in the preferred embodiment is a substantially flat plate which has the approximate contour of a rectangle, to be more exact a trapezoid, with four peripheral edge faces, one of which, preferably one of the longer edges, has a tooth flank profile and also a plurality of interruptions in the form of slots to receive the hard metal interchangeable plates and the clamping wedge portions, whilst the other longer edge face extends straight in the side view of the plate. In the simplest case, the edge face is a narrow flat face. However, it can also have a profile in section so that when fixed to the base member of a saw blade it can be prevented from moving out of the plane of the saw blade.

The two shorter edge faces connecting the two longer edges of the rectangle or trapezoid, one of which is disposed in the direction of forward movement of the segment plate to the front and the other of which is disposed to the rear, should extend substantially straight in the side view, since this is a very simple and expedient design by means of which a plurality of segment plates can be arranged in a row behind one another. Preferably, the segment plates are arranged along the periphery of a circular disc. However, this is not absolutely necessary. By way of example, the individual segments can also be secured along a strip which is fixed to varying degrees, or along a link belt.

The front and rear edge faces of the individual segments can also be profiled, in order to engage into the corresponding edge faces of adjacent segments, and thus ensure accurate alignment and guidance. Exact alignment and guidance is, however, also ensured by connecting the segment plates to a base portion e.g. to a circular saw disc.

With reference to the receiving slot it should be stated that in the preferred embodiment of the invention the wails and the contact face of the slot are arranged and designed in such a way that when an interchangeable plate is inserted a defined contact point is formed on each of the faces, so that a well defined stable position is produced in the receiving slot for the interchangeable plate.

Moreover, one embodiment of the invention is preferred wherein in one of its side faces the segment plate has a shoulder which extends substantially parallel to the toothed edge, wherein the shoulder face is inclined towards the plane of the segment plate by the formation of an offset portion. If the face of the shoulder is flat, a so-called "dovetail" configuration results in the profile, i.e. one half of a dove-tail profile.

Therein, the substantially flat segment plate is comprised basically of two plate regions of different thickness, wherein the thicker region has the toothed edge and the corresponding receiving slots for the interchangeable plates and wedges, and is separated from the thinner segment plate region by a shoulder in a side face. This thinner plate region is then placed on a substantially flat base portion, and is secured thereto, wherein the shoulder rests upon an outer edge of the base portion. By virtue of this design, it is possible, in a simple way, to be able to arrange and change over on the base member, in a way which is accurate in terms of positioning, entire segment plates which can have at least one, possibly also more, cutting inserts or interchangeable plates. Therein, one embodiment of the invention is preferable wherein a projection is provided on the thinner plate region which rises from the plane of the thinner plate region on the same side of the plate as the shoulder, wherein the surface of this projection is preferably parallel to the plate surface and particularly, preferably in a plane with the surface of the thicker plate region, which surface projects around the width of the shoulder. To be more exact, a segment plate of this kind can be made of a thicker plate, for example, wherein the thinner plate region is produced by milling away a layer of the plate along a strip parallel to the longer edge of the approximately rectangular segment plate, wherein, however, a portion remains in this strip which then rises, in the form of a remaining projection, out of the plane of the thinner plate region.

In the plan view, this projection is preferably substantially rectangular in shape, wherein this rectangle can be arranged both substantially parallel to the outer edges or contours of the segment plate, but possibly also inclinedly thereto.

The side flanks of the projection can extend vertically to the plane of the segment plate. However, they can also be slightly inclined to the segment plate plane, so that the projection thus assumes the shape of a frustum of a pyramid, preferably still with a relatively small acute angle of the pyramid. The incline of the side faces can also be restricted to one or two oppositely disposed side faces, in particular the radially inner and outer faces. The projection serves primarily to accurately align the segment and to transfer forces between the segment plate and the (circular) saw blade and if possible it should be manufactured with accuracy so that it fits exactly in a recess in the base portion, to which the segment plate is fixed. The side faces of the projection can then serve to transfer forces from the base portion to the segment plate and vice versa, so that these forces do not have to be received by fixing elements. Advantageously, rivet fixtures can be abandoned thereby, and the segment plate can be secured to the base member by the use of screws. To this end, it is expedient to provide bores or threaded bores in mutual alignment in the segment plate or base member.

One preferred embodiment from the point of view of simple manufacture has a projection in the form of a circular, possibly quadratic, journal, which is provided for engagement in an elongate hole.

As already mentioned, the segment plates are, above all, provided for use on a circular saw blade, wherein the circular saw blade in question in the preferred embodiment is a circular disc which has a thinner annular zone or peripheral zone along its outer periphery, this zone being offset from the inner disc portion by a shoulder and being complementary, so to speak, to the thinner segment plate region. Therein, the thickness of the segment plate and of the circular disc, and, above all, the thicknesses of the thinner regions of the segment plate and circular disc which come to rest upon one another are preferably such that the surfaces of the segment plate and the circular disc end in alignment with one another on both sides, i.e. are disposed in one common plane. Since in the preferred embodiment the segment plate has an edge face which extends straight in the side view, it is provided analogously that the thinner annular zone or shoulder which offsets the thinner annular zone from the inner region of the disc consists of a plurality of straight sections which together form a polygonal configuration.

In terms of manufacture, it is, however, expedient and therefore also preferable if the radial contact faces (in peripherally extending faces which receive radial forces) are arcuate segments, the radius of which corresponds exactly to the spacing from the center point of the circular saw blade. Therefore, the segment plates can no longer be used for circular saw blades of different diameter, but the manufacture of circular saw blades and also of the segment plates themselves is considerably simplified so that an embodiment of this kind is particularly preferable if relatively large series are to be manufactured of fixed diameter.

It is clear to the skilled person that fixing the interchangeable plates to the segment plates is dependent upon the fixture of the segment plates to the corresponding base members such as, for example, to the circular discs of circular saw blades, and on the transmission of forces between these latter members. This fixture and transmission of forces can also be used for segment plates which have soldered or welded cutting inserts.

Preferably, the shoulder of the segment plate is parallel to the straight longitudinal edge of the segment plate, the outer edge of the annular zone of the disc then clearly extends in a corresponding polygonal configuration. The annular zone and the thinner segment plate region are preferably exactly equal in width, so that in the assembled condition of the segment plates the shoulder of the segment plate is placed exactly on the outer edge of the disc or on the annular zone of the disc. While the radially inwardly disposed longitudinal edge of the segment plate sits exactly on the shoulder which forms the transition from the inner disc portion to the annular zone. As already mentioned, the shoulder of the segment plate should form an offset portion in the preferred embodiment, and be in the form of a semi-dovetail configuration, for example. Correspondingly, the outer edge of the annular zone is then suitably bevelled, wherein the shoulders on the circular disc and the base edge of the segment plate can also have a corresponding curvature. In such a case, if the projection which transmits forces between the segment plate and the base disc also transfers radial forces well, then the radially inner and outer sides of the projection must also be correspondingly bevelled so that the projection is seated in a recess with a proper fit, which recess is provided at the appropriate place in the individual sections of the annular zone. It is to be appreciated that the continuous recesses in the sections of the annular zone are usually complementary in shape to the projection provided on the segment plate. Since the segment plate is thickest in the region of the projection, the recess clearly has to be continuous in the annular zone of the circular disc. In the simplest case, the recess is in the form of an elongate hole.

The segment plates arranged on a circular disc or another "saw blade" in a row behind one another do not have to rest against one another. Instead, the segments can be slightly distanced from each other, so that they may be arranged on circular discs of somewhat larger or smaller diameter, but at least being able to compensate for possible manufacturing tolerances.

BRIEF DESCRIPTION OF THE DRAWINGS

Further advantages, features and possible applications of the present invention will emerge clearly from the following description of preferred embodiments and from the associated drawings, wherein.

Figure 1:
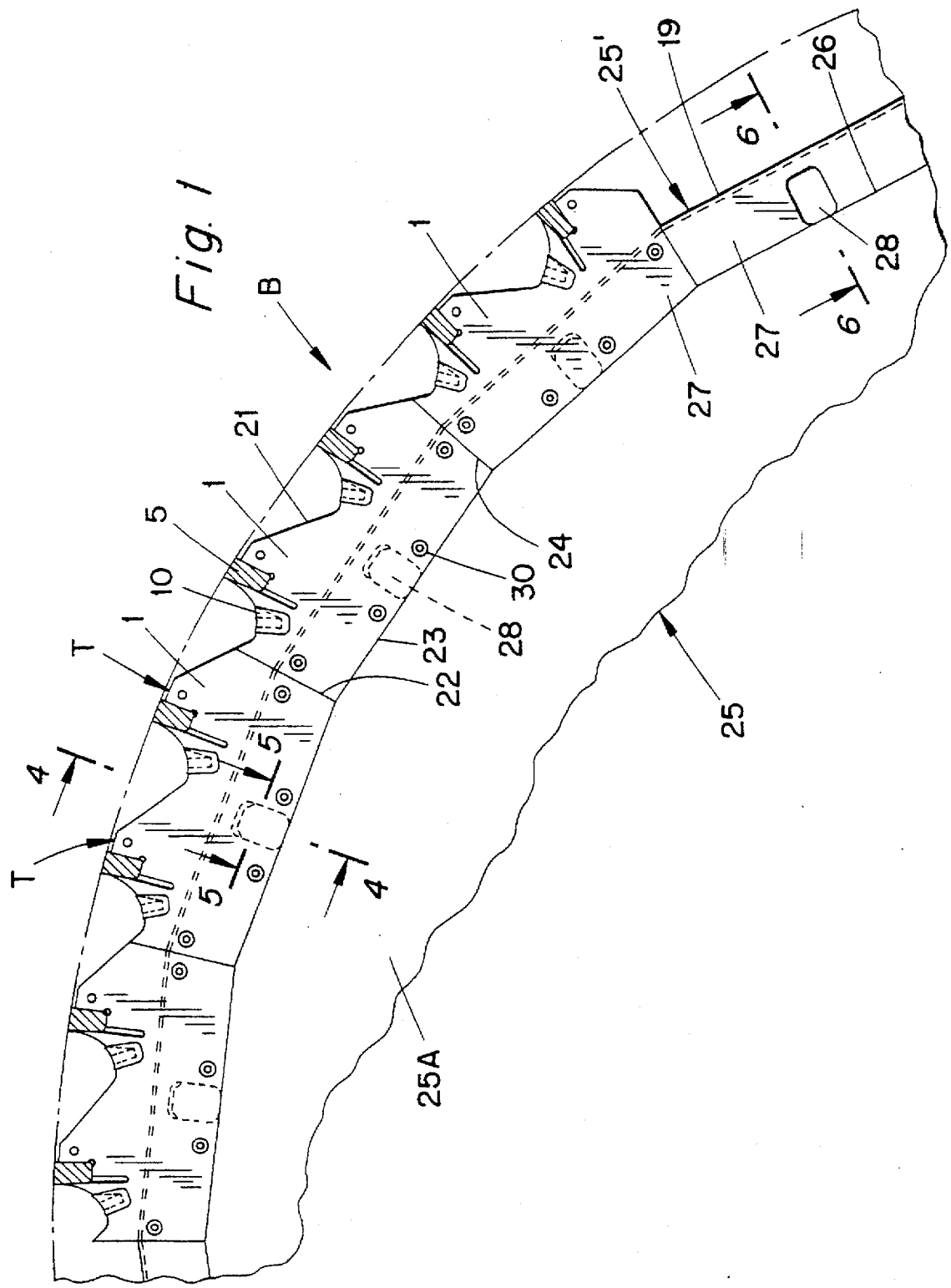
FIG. 1 is a section of a circular saw blade with segment plates fixed thereto, according to the present invention.

FIG. is a sectional view taken along line 7—7 in FIG. 1; and

FIG. 8 is a view similar to FIG. 1 depicting various modifications of the invention.

FIG. 9 depicts another modiciation of the invention.

DETAILED DESCRIPTION OF PREFERRED EMBODIMENTS OF THE INVENTION

FIG. 1 shows a segment of a substantially circular base member 25 of a circular saw blade B to which segment plates 1 have been secured. The disc or the base portion 25 has a thick inner zone 25A, and a peripheral zone 25' of reduced thickness consisting of straight sections 27 which together form a polygonal configuration. The transition from the inner zone 25A to the thinner peripheral zone 25' is formed by a shoulder 26, which, in the example shown, is in the form of a face which extends perpendicularly to the plane of the plate. Each section 27 has a substantially rectangular recess 28.

Figure 7:
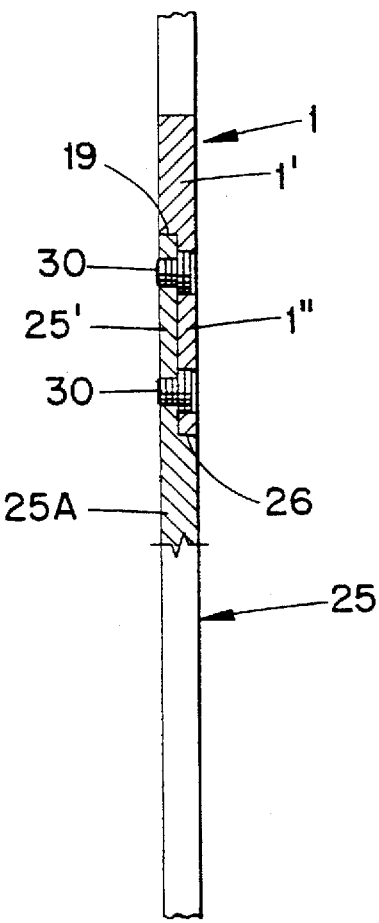
Figure 4:
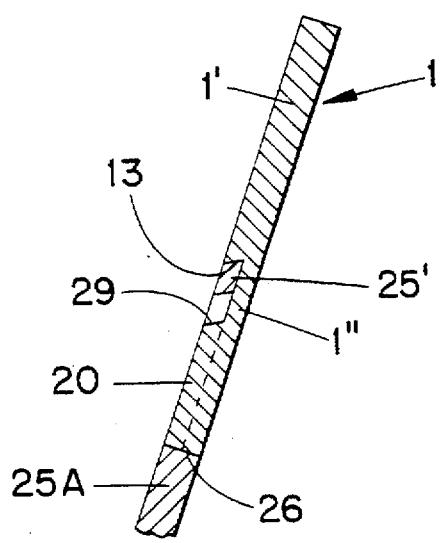
FIG. 4 is a sectional view taken along line 4—4 in FIGS. 1 and 2.
Figure 5:
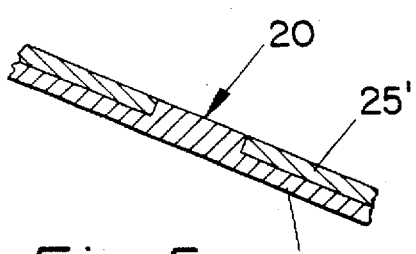
FIG. 5 is a sectional view taken along line 5—5 in FIGS. 1 and 2.

Each segment plate 1 is secured to a respective section 27. The segment plate 1 comprises a thick plate region 1' (see FIGS. 2 and 7) and a thin plate region 1". The thicker plate region 1' is disposed radially outside of the outer edge 19 of the respective section 27. The thinner plate region 1" forms an overlap with the thinner peripheral zone 25' of the section 27. Each segment plate 1 is secured to a section 27 by means of four fixing screws 30 (see FIG. 2). The thin segment plate region 1" has a projection 20 which fits into the recess 28 of section 27 with as accurate and close a fit as possible at least in the circumferential direction.

The projection 20 and the recess 28 are substantially quadrangular in the plan view, wherein the closeness of the fit is particularly important in the circumferential direction of the circular saw blade, since it is the engagement between the projection 20 and a radial side of the recess 28 which transmits forward movement forces from the circular disc 25 to the individual segment plates 1; the screws 30 simply serve to secure the segment plate 1 to the respective section 27.

Each segment plate 1 which is shaped roughly rectangularly in cross section has teeth along one edge 21. The edge 23 which is oppositely disposed to the tooth flank edge 21 is straight, as are the short edges 22 and 24 which extend between the two other edges 21 and 23. The oppositely disposed short side edges 22, 24 do not extend parallel to each other as in a conventional rectangle, but are inclined slightly relative to each other, so that in the embodiment shown, after assembly to the circular disc 25 they extend basically in a radial direction and rest upon the corresponding sides of adjacent segments 1.

Each segment plate 1 has substantially two teeth T. In the apex region of each tooth a slot 3 is provided to receive an interchangeable plate such as a cutting insert 5. Provided in the valley or base separating two tooth flanks is another slot 4 in which a wedge portion 10 engages. The portion of the segment plate 1 disposed between the two closely adjacent slots 3, 4 forms an elastically movable clamping finger 8. Each of slots 3, 4 has generally radial walls which diverge slightly radially outwardly. During insertion of a suitably fitting interchangeable plate of suitable wedge-shaped, the clamping finger 8 is forced outwardly, so that the plate is secured in its inserted position by frictional engagement with the finger. The wedge portion 10 which was previously loosely disposed in the slot 4 is pushed further into the slot 4 by a screw 14 which engages into a threaded bore 15 at the base of the slot 4 and which also passes through a bore in the wedge portion 10, the head of the screw being secured to the top of the wedge portion 10. By tightening the screw 14 it is possible to drive the wedge portion 10 further into the slot 4, and the clamping finger 8 is thus pressed even more firmly against the interchangeable plate 5. By virtue of this additional clamping effect the plate 5 is held sufficiently by the clamping finger 8, so that even with heavy impact loads the plate 5 is not loosened.

Figure 3:
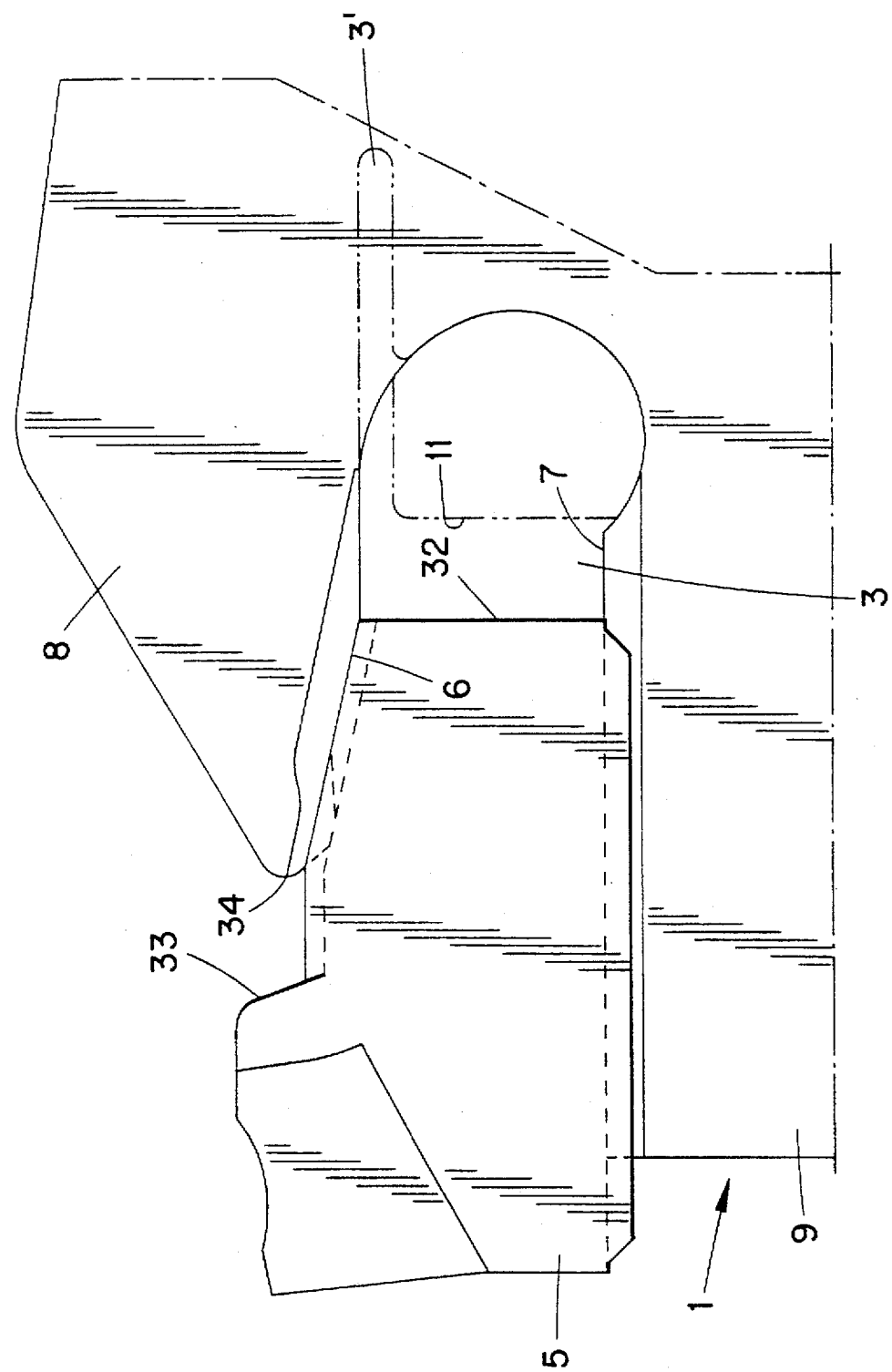
FIG. 3 is a detailed view of a receiving slot and a correspondingly adapted cutting insert of the saw blade.

Details of an embodiment with one particular design of slot 3 and a correspondingly adapted cutting insert 5 are shown in FIG. 3. The corresponding shape of the cutting insert 5 and of the slot 3 with oppositely disposed walls 6 and 7 is described in detail in the European Patent Application published under No. 0 242 343, which is incorporated by reference herein. Also, some variants are indicated in FIG. 3. Thus, for example, the tooth may form an abutment face 11 disposed inside the slot 3 for engaging the rearward face 32 of the cutting insert 5, so that the abutment face 33 provided on a shoulder of the cutting insert 5 does not have to abut against the lug of the clamping finger 8. In addition or alternatively, the slot 3 can have a rearward extension 3' in order to increase the elasticity of the clamping finger 8.

With an embodiment according to FIG. 3 it is not necessary for the clamping face 6 of the clamping finger 8 to extend at an acute angle to the face 7 on the oppositely disposed side of the slot. This face does not necessarily have to extend parallel to the ramp face found on the respective side of the insert 5, if the clamping provided by the front end of the clamping finger on the front clamping face of the cutting insert 5 is sufficient, which cutting insert extends substantially parallel to the face 7.

Figure 6:
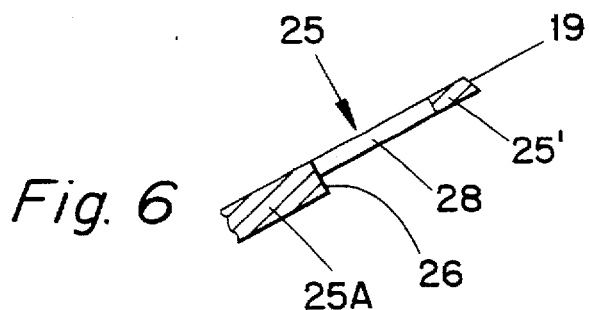
FIG. 6 is a sectional view taken along line 6—6 in FIG. 1.

With respect to the plates 1, the combined thicknesses of the thin region 1" and the projection 20 equals the thickness of the thick region 1'. The thinner plate region 1" and the thicker plate region 1' are separated by a shoulder 13. The shoulder 13 is formed by a flat face which is undercut so that an offset portion or a so-called "dove-tail" is produced, i.e. a part of a dove-tail profile. The adjacent side 29 of the projection 20 can either have the same inclination as the shoulder 13, or it can be perpendicular to the plane of the segment plate 1. In the latter case, however, the recess 28 for the projection 20 must have an appropriate clearance in the radial direction, so that the projection 20 can be introduced into the recess 28 and simultaneously so that the inclined shoulder 13 can be placed onto the correspondingly inclined outer edge 19 of the annular zone 25' of the section 27. The inclined free edge 19 of the peripheral zone 25' is clearly shown in section in FIG. 6. The regions of portion 1' of the segment plate and portion 25A of the circular disc are substantially equal in thickness, and the portions 1" and 25' of the segment plate and circular disc 25, respectively, are substantially equal in thickness and are exactly half as thick as either of the portions 1' and 25A. The circular saw blade assembly thus has a continuous constant thickness from the region 25A to the region 1' of the segment plates. Preferably, the thin peripheral zone 25' has suitable threaded bores for the screws 30, the heads of which screws are formed, together with the corresponding bores, in the thinner region 1" of the segment plate in such a way that the screws end flush with the surface of the segment plate 1 or are slightly countersunk. The thread length of the screws 30 is such that the screws do not project beyond the surface of the zone 25'.

Figure 2:
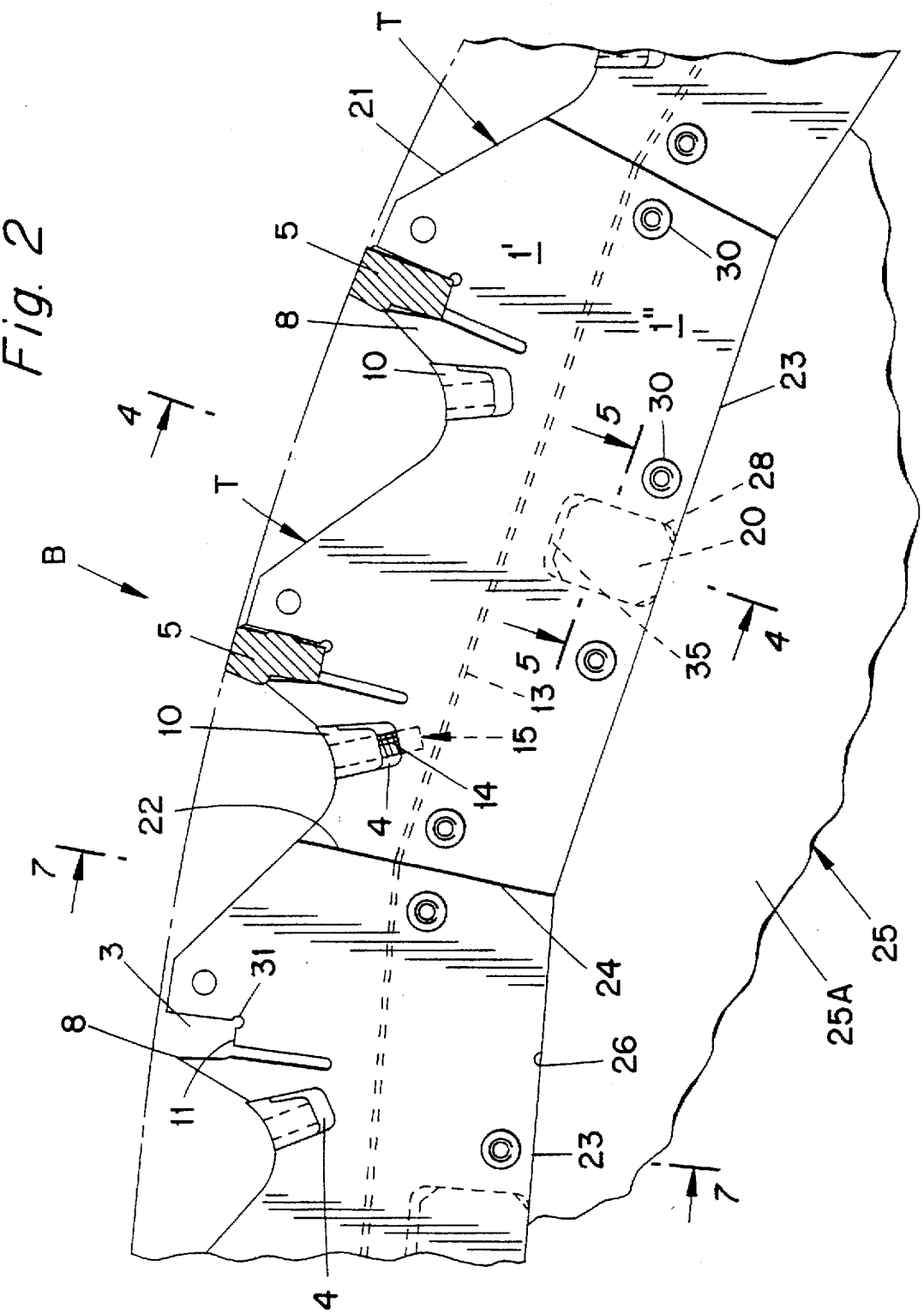
FIG. 2 is an enlarged fragmentary view of FIG. 1.

As can clearly be seen in FIG. 2, the projection 20 has a small radial play 35 on the radially outer side with respect to the corresponding recess 28, which play is to enable the undercut shoulder 13 to be placed on the inclined edge 19 of the section 27.

FIG. 8 shows various embodiments of segment plates which are mounted to the same circular disc 25. Various types of projections 20A, 20', 20" and 20"" are seen. The projection 20' is rectangular in the plan view, but is inclined relative to the radial direction of the circular disc 25. The projection 20A is cylindrical. Another shape (20B) could be a frustum of a pyramid. The projections 20" and 20"' are not joined integrally with the segment plate, but constitute separate portions which are inserted into appropriate openings in either the inner disc 25A or the annular region 25', and in either the thinner region 1" or the thick region 1"'. This however requires additional screws or fixing means and is therefore less preferable.

To the right in FIG. 8 it is also possible to see variants of the mounting of the cutting inserts 5 in the slot 3. The reference numeral 17 denotes an abutment point between an abutment face 33 and the lug 34 of a clamping finger 8 (see FIG. 3). The reference numeral 18 denotes play between the lug of the clamping finger 8 and a face of the cutting insert 5 which abuts instead with its rearward face 32 on an abutment face 11 inside the slot 3 as shown in FIG. 3. The reference numeral 31 is a so-called "free feature" in the form of a ¾-bore i.e., a bore extending for three quarters of a full circle, which is intended to prevent the corner of the cutting insert from engaging with an inner corner formed between the face 11 and the wall 7 of the slot 3, so that the rear face 32 always rests neatly and in a well-defined position on the abutment face 11.

The segment plates denoted by the reference numerals 101, 102 in FIG. 8 differ from the other segment plates simply by the fact that they are spaced circumferentially apart by a gap G at the front and rear side edges 22, 24. A small spacing such as this can be provided purposefully to compensate for any manufacturing tolerances. A spacing of this kind can, however, occur if a segment plate is used on a circular saw blade of slightly greater diameter and with the same number of segment plates. As long as the gap G between adjacent segment plates is not too great or occupied by saw chips, which can cause problems, these spacings can be tolerated, so that at least with circular discs of substantially equal diameter it is possible to use one and the same segment plates.

Moreover, however, one and the same segment plate can be used for a given circular saw diameter, as also for diameters which are practically twice (and four times) this diameter, if it is remembered that the front and rear side edges 22, 24 are no longer large surface areas, but are only disposed against one another in the corner region of the transition to the toothed edges 21. The straight contact faces 23, 26 and 13, 19 have a positive effect here because their shape is dependent on the saw blade diameter. A small break in the tooth flanks has no adverse effects. An additional segment plate is simply inserted between every two segment plates, so that adjacent segment plates touch one another in the corner region of the edges 21/22 and 21/24. Therein, the radius is doubled up to that corner region, and thus approximately also the diameter of the saw blade as a whole, wherein the circular discs 25 can be manufactured simply of appropriate diameters and peripheral sections 27.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

I claim:

1. A segment plate adapted to be secured to an outer circumferential edge of a circular saw disc, said segment plate including radially outer and inner regions; said outer and inner regions forming radially outer and inner edges, respectively, of said segment plate; said outer region being thicker than said inner region whereby a shoulder extends from a side surface of said inner region to a side surface of said outer region; said outer edge including first and second slots each opening at said outer edge and extending toward said inner edge; said first slot adapted for receiving a replaceable cutter member; said first and second slots being spaced apart by a portion of said segment plate, said portion defining an elastically movable clamping finger; a first side wall of said finger forming a side of said first slot; a second side wall of said finger forming a side of said second slot; said first and second side walls converging toward one another and toward said inner edge so that a width of said finger is narrowest at a location remote from said outer edge; said second slot receiving a clamping wedge for urging said clamping finger toward said first slot for clamping a replaceable cutter member therein; a screw extending through said clamping wedge and projecting into said segment plate; a projection extending perpendicularly from said side surface of said inner region from which said shoulder extends; said projection spaced radially inwardly from both said shoulder and said outer region; a combined thickness of said inner region and said projection being substantially equal to a thickness of said outer region, whereby a free outer end of said projection is substantially coplanar with said side surface of said outer region.

2. A segment plate according to claim 1 wherein said shoulder is inclined such that its intersection with said side surface of said outer region is located closer to said inner edge than is the intersection of said shoulder with said side surface of said inner region, to form an undercut.

3. A segment plate according to claim 1, wherein a radially inner end of said first slot forms an abutment surface against which a replaceable member abuts.

4. A segment plate according to claim 3, wherein said first slot includes two side walls, one of said walls being said first side wall, said side walls and said abutment surface engaging a replaceable member at respective contact points.

5. A segment plate according to claim 1, wherein said projection is substantially rectangular when viewed in plan.

6. A segment plate according to claim 1, wherein three edges of said projection are oriented parallel to three edges of said plate.

7. A segment plate according to claim 1, wherein said projection is of circular cross section.

8. A segment plate according to claim 1, wherein said projection has the shape of a frustum of a pyramid.

9. A segment plate according to claim 1, wherein said plate has two said first slots and two said second slots.

10. A segment plate according to claim 1, wherein said first slot has two generally radially extending side walls, one of said walls being said first side wall, said walls diverging toward the open end of said slot.

* * * * *